(12) United States Patent
Hsieh et al.

(10) Patent No.: US 9,890,963 B2
(45) Date of Patent: Feb. 13, 2018

(54) AIR CONDITIONER VENTILATION AND PRE-COOLING DEVICE

(71) Applicant: DELTA ELECTRONICS, INC., Taoyuan County (TW)

(72) Inventors: Yuan-Ping Hsieh, Taoyuan County (TW); Tung-Hung Shih, Taoyuan County (TW); Chao-Hsien Chan, Taoyuan County (TW); Pin-Chen Lai, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 100 days.

(21) Appl. No.: 14/806,891

(22) Filed: Jul. 23, 2015

(65) Prior Publication Data

US 2016/0123652 A1    May 5, 2016

(30) Foreign Application Priority Data

Oct. 29, 2014 (TW) .............................. 103137510 A

(51) Int. Cl.
*F24F 5/00* (2006.01)
*F24F 1/00* (2011.01)

(52) U.S. Cl.
CPC .... *F24F 5/0035* (2013.01); *F24F 2001/0088* (2013.01); *Y02B 30/545* (2013.01)

(58) Field of Classification Search
CPC ...... F24F 1/42; F24F 13/224; F24F 2321/141; F24F 2321/147; F24F 2013/225; F24F 6/02; F24F 3/1411; F24F 13/222; F25D 2321/1412; F25D 21/14
See application file for complete search history.

(56) References Cited

U.S. PATENT DOCUMENTS

| | | | |
|---|---|---|---|
| 3,651,660 A * | 3/1972 | Quiros | F24F 1/027 62/279 |
| 4,938,035 A | 7/1990 | Dinh | |
| 6,354,101 B1 * | 3/2002 | Levitin | F24F 1/022 62/274 |

(Continued)

FOREIGN PATENT DOCUMENTS

| | | |
|---|---|---|
| TW | 484697 | 4/2002 |
| TW | M416055 | 11/2011 |

OTHER PUBLICATIONS

Office Action dated Sep. 23, 2015 from corresponding application No. TW 103137510.

(Continued)

*Primary Examiner* — Cassey D Bauer
(74) *Attorney, Agent, or Firm* — Hauptman Ham, LLP

(57) ABSTRACT

An air conditioner ventilation and pre-cooling device includes a carrying container, a cooling unit and an intake fan. The carrying container is provided for containing condensed water of the evaporator, the cooling unit is connected to the condensed water, and the intake fan guides outside air to pass through the cooling unit. The heat of the condensed unit is conducted to the cooling unit, and the outside air passes through the cooling unit and exchanges heat with the cooling unit to form a pre-cooled air. The outside air is pre-cooled before it enters into an indoor environment, so as to achieve the environmental protection and power saving effects and improve the cooling efficiency.

9 Claims, 4 Drawing Sheets

(56) References Cited

U.S. PATENT DOCUMENTS

2002/0073720 A1    6/2002   Bourne et al.
2004/0144118 A1*   7/2004   Hebert .................. F24F 12/006
                                                                         62/305

OTHER PUBLICATIONS

Reexam Report dated Mar. 9, 2017 from corresponding application No. TW 103137510.
Office Action dated Aug. 16, 2016 from corresponding application No. JP 2015-156835.
Office Action dated Mar. 7, 2017 from corresponding application No. JP 2015-156835.

* cited by examiner

AIR CONDITIONER VENTILATION AND PRE-COOLING DEVICE

FIELD OF THE INVENTION

The present invention relates to an air conditioning device, and more particularly to a ventilation and pre-cooling device of an air conditioner.

BACKGROUND OF THE INVENTION

Air conditioner is a device for changing the temperature, humidity, and air purity in a specific region. The ambient temperature or humidity can be adjusted by the heating or dehumidification function of the air conditioner.

Present air conditioner manufacturers spare no effort to reduce the power consumption of the air conditioner in order to cope with the trends of power saving and carbon reduction. As to the conventional air-conditioning devices, a temperature difference between the outside air and an indoor environment exists when outside fresh air is guided into the indoor environment, so that an indoor ventilation unit consumes more power to reach the required temperature. On the other hand, the conventional air conditioner comes with an evaporator that produces condensed water by heat exchange and thus requires an additional water pipe to discharge the condensed water. However, the condensed water is not recycled or reused, and the conventional air conditioner wastes unnecessary water resources.

Therefore, it is a main subject of the present invention to provide an air conditioner with a condensed water recycling and reusing device and reuses the condensed water to pre-cool the outside air, so as to achieve the environmental protection and power saving effects and improve the cooling efficiency.

SUMMARY OF THE INVENTION

In view of the drawbacks of the prior art, it is a primary objective of the present invention to provide an air conditioner ventilation and pre-cooling device capable of recycling the condensed water of the air conditioner and using the condensed water to pre-cool the outside air to achieve the environmental protection and power saving effects and improve the cooling efficiency.

To achieve the aforementioned and other objectives, the present invention provides an air conditioner ventilation and pre-cooling device disposed adjacent to an evaporator for cooling an outside air, and the air conditioner ventilation and pre-cooling device comprises: a carrying container for containing condensed water of the evaporator; a cooling unit being thermal coupled to the condensed water for heat exchange with condensed water; and an intake fan for guiding the outside air to flow through the cooling unit; wherein a pre-cooled air is formed by heat exchanged between the outside air flowing through the cooling unit and the cooling unit.

Compared with the prior art, the air conditioner ventilation and pre-cooling device of the present invention recycles the low-temperature condensed water of the air conditioner and thermal connects the condensed water to a cooling unit, and heat of the air conditioner is absorbed and conducted to the condensed water, so as to lower the overall temperature. Then the outside air passing through the cooling unit will carry away the heat of the cooling unit. In other words, a pre-cooled air is formed from the outside air by the cooling effect of the cooling unit. Therefore, the temperature difference between the temperature of the outside air and the temperature of the indoor environment is not too large. The outside air will not have a too-significant effect to the overall indoor temperature when the outside air enters into an indoor environment. Therefore, the air conditioner consumes less power for the required ambient temperature, so as to achieve the environmental protection and power saving effects and improve the cooling efficiency. In addition, the recycle and reuse of the condensed water comply with the environmental protection requirement and improve the practicality of the present invention.

DESCRIPTION OF THE PREFERRED EMBODIMENTS

The technical contents of the present invention will become apparent with the detailed description of preferred embodiments accompanied with the illustration of related drawings as follows.

Figure 1:
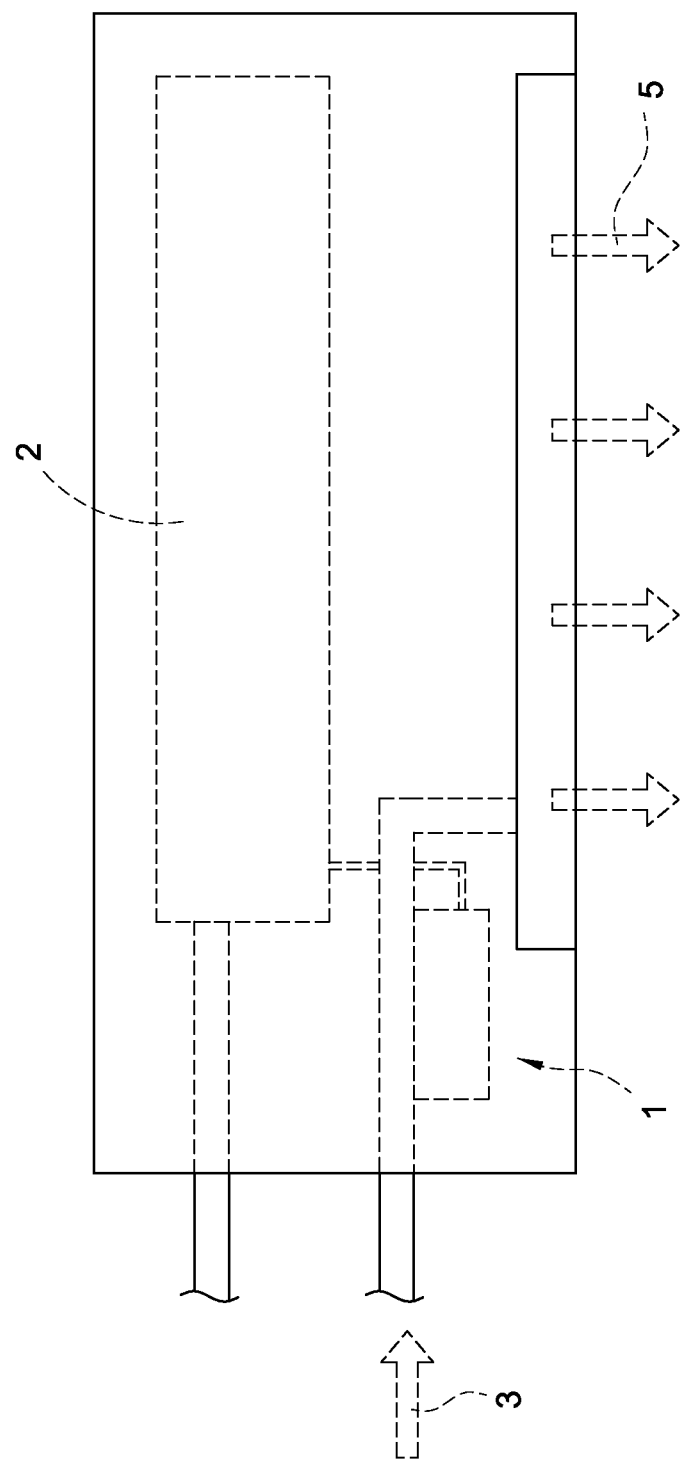
FIG. 1 is a schematic view of installing an air conditioner ventilation and pre-cooling device of the present invention.

With reference to FIG. 1 for a schematic view of installing an air conditioner ventilation and pre-cooling device of the present invention, the air conditioner ventilation and pre-cooling device 1 is disposed adjacent to an evaporator 2 and provided for cooling outside air 3. When the air conditioner of the present invention is operated, the air conditioner recycles the condensed water produced by the evaporator 2 and pre-cools the outside air by the air conditioner ventilation and pre-cooling device 1 to reduce the temperature difference between the temperature of the outside air 3 and the indoor temperature, so as to achieve the environmental protection and power saving effects and improve the cooling efficiency.

Figure 2:
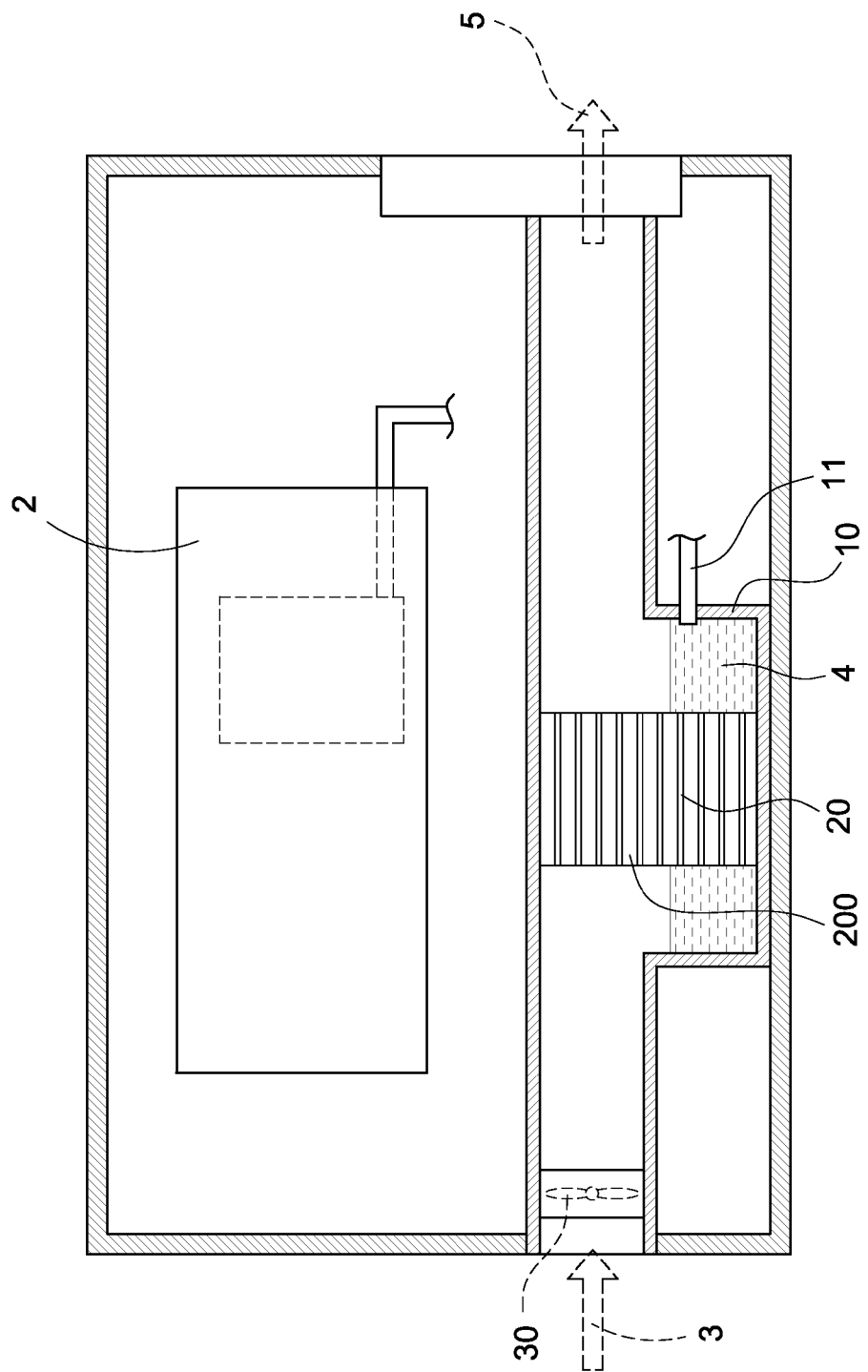
FIG. 2 is a schematic planar view of an implementation mode of an air conditioner ventilation and pre-cooling device of the present invention.

With reference to FIG. 2 for a schematic planar view of an implementation mode of an air conditioner ventilation and pre-cooling device of the present invention, the air conditioner ventilation and pre-cooling device 1 comprises a carrying container 10, a cooling unit 20, and an intake fan 30. The carrying container 10 is provided for containing condensed water 4 of the evaporator 2, and the temperature of the condensed water 4 is lower than the temperature of the cooling unit 20.

The cooling unit 20 is thermal connected to the condensed water 4 and provided for conducting heat from cooling unit 20 to the condensed water 4. The overall temperature of the cooling unit 20 in thermal contact with the condensed water 4 is decreased accordingly. Finally, the outside air 3 is guided to pass through the cooling unit 20 by the intake fan 30, so as to reduce the temperature difference of the intake outside air 3 with respect to the temperature of the indoor environment.

In a preferred embodiment of the present invention, the intake fan 30 is disposed at the front of the cooling unit 20 through where the outside air 3 passes. In a practical application, the quantity of intake fans 30 is not limited, and the intake fan(s) 30 may also be installed at the front, the rear, or both of the cooling unit 20.

More specifically, the heat of the condensed water 4 is conducted to the cooling unit 20. The cooling unit 20 includes a plurality of airflow channels 200, and the outside air 3 passes through the airflow channels 200 and thermal contacts with the cooling unit 20. Therefore, a pre-cooled air 5 is formed by heat exchange between the outside air 3 passing through the cooling unit 20 and exchanges heat.

Preferably, the carrying container 10 is a tray, but the invention is not limited to such arrangement only. In addition, the carrying container 10 further includes an overflow pipe 11. Whenever, the level of the condensed water 4 in the carrying container 10 exceeds a predetermined height, the condensed water 4 flows into the overflow pipe 11 to prevent any possible overflow of the condensed water contained in the carrying container 10.

In this preferred embodiment, the cooling unit 20 is a fin module disposed in the carrying container 10 and directly contacted with the condensed water 4. The heat of the cooling unit 20 is conducted to the condensed water 4 to lower the overall temperature of the cooling unit 20. When the outside air 3 flows through the airflow channels 200, the cooling unit 20 performs a heat exchange with the outside air 3 to lower the temperature of the outside air 3.

Figure 3:
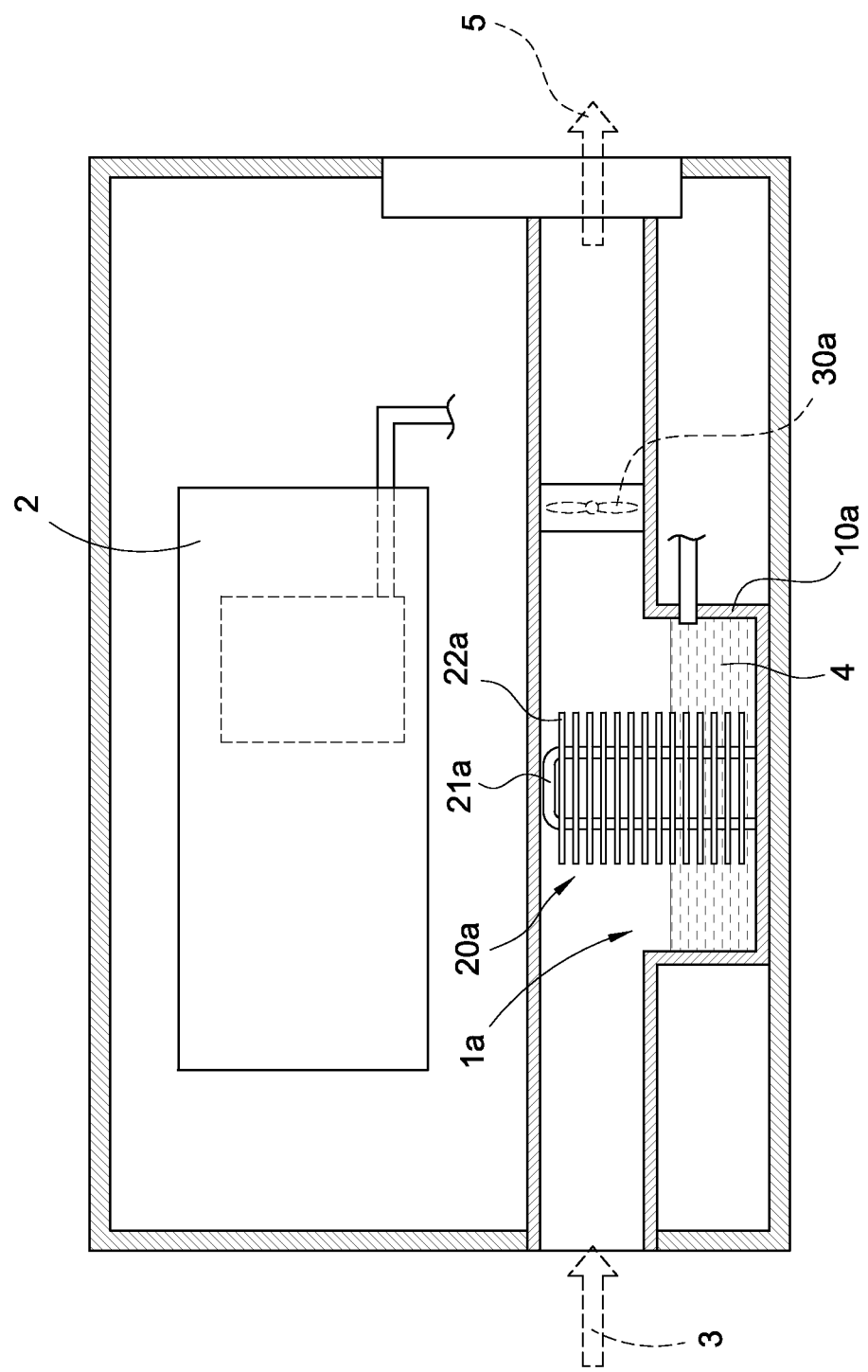
FIG. 3 is a schematic planar view of another implementation mode of an air conditioner ventilation and pre-cooling device of the present invention.

With reference to FIG. 3 for another implementation mode of an air conditioner ventilation and pre-cooling device of the present invention, the air conditioner ventilation and pre-cooling device 1a of this preferred embodiment comprises a carrying container 10a, a cooling unit 20a, and an intake fan 30a. The difference between this preferred embodiment and the previous preferred embodiment resides on the implementation mode of the cooling unit 20a.

In this preferred embodiment, the cooling unit 20a includes a heat pipe 21a and a plurality of fins 22a passing the heat pipe 21a. The heat pipe 21a is partially submerged in the condensed water 4, and the fins 22a are also partially submerged in the condensed water 4. Another difference between this preferred embodiment and the previous preferred embodiment resides on the installation position of the intake fan 30a. In this preferred embodiment, the intake fan 30a is disposed at the rear of the cooling unit 20a. In other words, the intake fan 30a is disposed at the rear of the cooling unit 20a through where the outside air 3 passes. Similarly, when the intake fan 30a is operated, the outside air 3 is guided and passed through the cooling unit 20a to exchange heat with the cooling unit 20a, so as to form a pre-cooled air 5.

Figure 4:
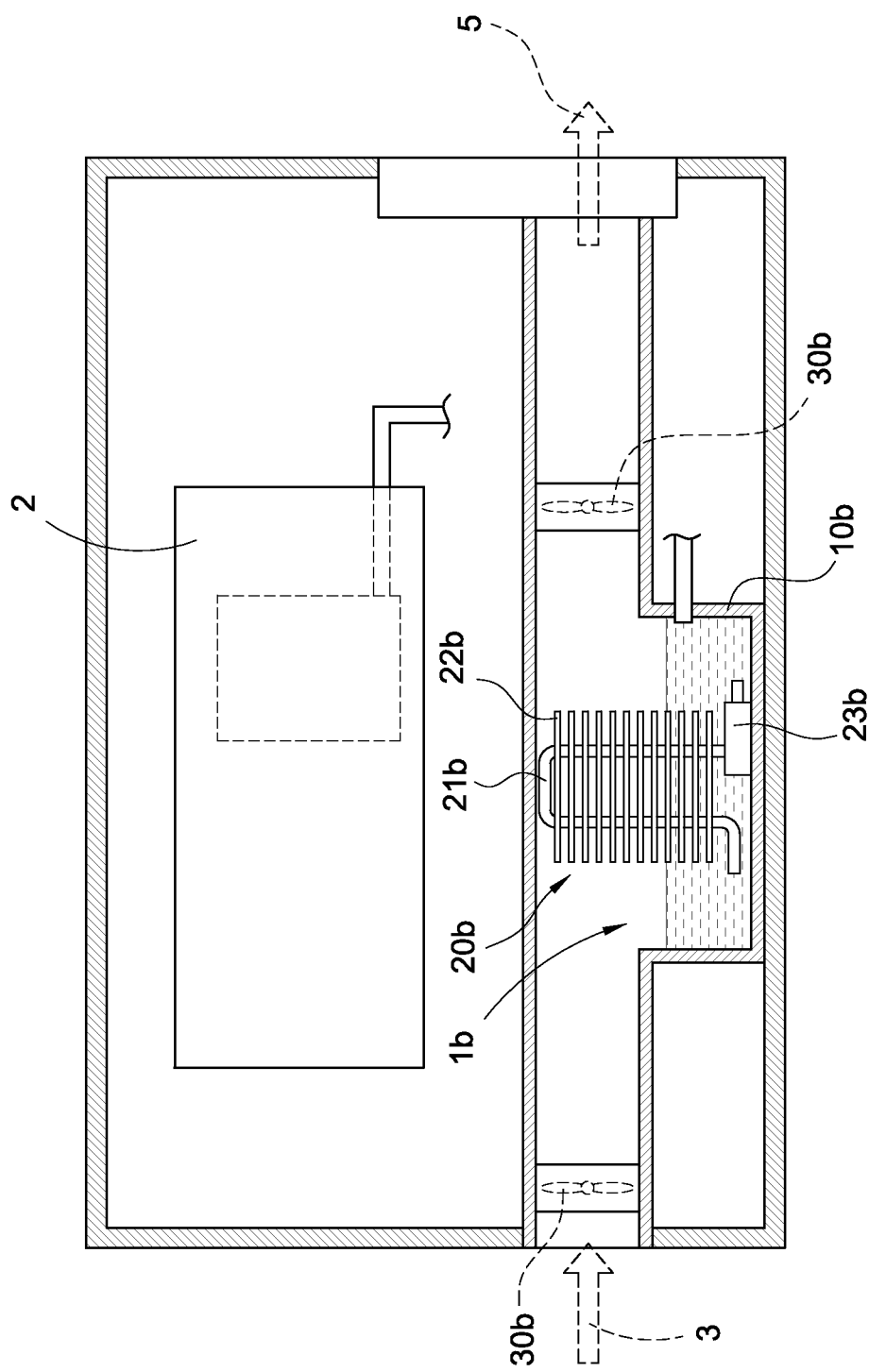
FIG. 4 is a schematic planar view of a further implementation mode of an air conditioner ventilation and pre-cooling device of the present invention.

With reference to FIG. 4 for a further implementation mode of an air conditioner ventilation and pre-cooling device of the present invention, the air conditioner ventilation and pre-cooling device 1b of this preferred embodiment comprises a carrying container 10b, a cooling unit 20b, and an intake fan 30b. The difference between this preferred embodiment and the previous preferred embodiment resides on the implementation mode of the cooling unit 20b.

In this preferred embodiment, the cooling unit 20b includes a thermal conducting pipe 21b, a plurality of fins 22b passing the thermal conducting pipe 21b, and a water pump 23b coupled to the thermal conducting pipe 21b. The condensed water 4 in the carrying container 10b is pumped to flow into an end of the thermal conducting pipe 21b by the water pump 23b and out from the other end of the thermal conducting pipe 21b and gather in the carrying container 10b. Preferably, the thermal conducting pipe 21b is a copper pipe, and the fins 22b are aluminum plates. In practical applications, the materials of the thermal conducting pipe 21b and the fins 22b are not limited, and any material with the thermal conduction function may be used instead.

Another difference of this preferred embodiment resides on the installation position of the intake fan 30b. In this preferred embodiment, the air conditioner ventilation and pre-cooling device 1b includes a plurality of intake fans 30b. More specifically, an intake fan 30b is disposed separately at the front and rear of the cooling unit 20b to enhance the air-intake efficiency of guiding the outside air 3 into the cooling unit 20b and the venting efficiency of discharging the outside air 3 from the cooling unit 20b.

While the invention has been described by means of specific embodiments, numerous modifications and variations could be made thereto by those skilled in the art without departing from the scope and spirit of the invention set forth in the claims.

What is claimed is:

1. An air conditioner ventilation and pre-cooling device, disposed adjacent to an evaporator for cooling outside air and provided for ventilating an indoor environment, comprising:
   a carrying container configured to accommodate condensed water of the evaporator;
   a cooling unit, comprising a thermal conducting pipe, a plurality of fins passing through the thermal conducting pipe, and a water pump communicatively coupled to the thermal conducting pipe, the water pump being configured to cause the condensed water to flow through the water pump into an end of the thermal conducting pipe and out from another end of the thermal conducting pipe such that the condensed water gathers in the carrying container;
   an intake fan configured to cause the outside air to flow through the cooling unit, wherein the cooling unit is configured to cause a pre-cooled air to be formed by heat exchanged between the outside air caused to flow through the cooling unit and the condensed water caused to flow through the thermal conducting pipe; and
   a guiding channel configured to guide the pre-cooled air into the indoor environment unit.

2. The air conditioner ventilation and pre-cooling device of claim 1, wherein the carrying container is a tray.

3. The air conditioner ventilation and pre-cooling device of claim 2, wherein the carrying container further comprises an overflow pipe configured to receive the condensed water if the level of water in the carrying container exceeds a predetermined height.

4. The air conditioner ventilation and pre-cooling device of claim 1, wherein the cooling unit includes a plurality of airflow channels configured to accommodate a flow of the outside air for heat exchange with the condensed water caused to flow through the thermal conducting pipe.

5. The air conditioner ventilation and pre-cooling device of claim 1, wherein at least one fin of the plurality of fins of the cooling unit is in the carrying container and in direct contact with the condensed water.

6. The air conditioner ventilation and pre-cooling device of claim 1, wherein the cooling unit includes a heat pipe partially submerged in the condensed water.

7. The air conditioner ventilation and pre-cooling device of claim 6, wherein the heat pipe has at least one thermal conductive structure passing through the heat pipe and partially submerged in the condensed water.

8. The air conditioner ventilation and pre-cooling device of claim 1, wherein the intake fan is disposed at the front or rear of the cooling unit to cause the outside air to flow the cooling unit.

9. The air conditioner ventilation and pre-cooling device of claim 1, wherein the carrying container further comprises an overflow pipe configured to receive the condensed water if the level of water in the carrying container exceeds a predetermined height.

* * * * *